(12) United States Patent
Chen et al.

(10) Patent No.: US 7,372,579 B2
(45) Date of Patent: May 13, 2008

(54) APPARATUS AND METHOD FOR MONITORING TRENCH PROFILES AND FOR SPECTROMETROLOGIC ANALYSIS

(75) Inventors: Zhen-Long Chen, Dresden (DE); Peter Weidner, Roetz (DE); Pierre-Yves Guittet, Taipei (TW); Alexander Kasic, Dresden (DE); Barbara Schmidt, Dresden (DE); Anita Klee, Langebrueck (DE)

(73) Assignees: Infineon Technologies, AG, Neubiberg (DE); Nanya Technology Corporation (TW)

( * ) Notice: Subject to any disclaimer, the term of this patent is extended or adjusted under 35 U.S.C. 154(b) by 203 days.

(21) Appl. No.: 11/407,339

(22) Filed: Apr. 20, 2006

(65) Prior Publication Data

US 2007/0247634 A1 Oct. 25, 2007

(51) Int. Cl.
*G01B 9/02* (2006.01)
(52) U.S. Cl. ..................... 356/504; 356/632
(58) Field of Classification Search ............. 356/451, 356/453, 456, 495, 511, 504, 496
See application file for complete search history.

(56) References Cited

U.S. PATENT DOCUMENTS

| | | | | |
|---|---|---|---|---|
| 6,275,297 | B1 * | 8/2001 | Zalicki | 356/496 |
| 6,801,321 | B1 * | 10/2004 | Du-Nour | 356/504 |
| 7,019,844 | B2 * | 3/2006 | Venugopal et al. | 356/504 |

* cited by examiner

*Primary Examiner*—Hwa (Andrew) Lee
(74) *Attorney, Agent, or Firm*—Edell, Shapiro & Finnan, LLC

(57) ABSTRACT

An apparatus for monitoring a trench profile of a substrate includes a radiation-emitting unit for irradiating the substrate with infrared radiation. The intensity and/or polarization state of the infrared radiation reflected from the substrate is measured at a multitude of measuring frequencies. An analyzing unit determines the respective reflectance and relative phase change and/or relative amplitude change in relation to the respective measuring frequency. In addition, a reflectance spectrum, a relative phase change spectrum and/or a relative amplitude change spectrum may be obtained. By performing a Fourier transformation of the respective spectrum, a secondary Fourier spectrum is obtained. The secondary Fourier spectrum plots a virtual amplitude against corresponding values of a frequency periodicity that correspond to a substrate depth. Peaks of the virtual amplitude may indicate reflective planes within the substrate at respective depths. Thus, rough sections in the trench profile may be identified without modeling.

25 Claims, 8 Drawing Sheets

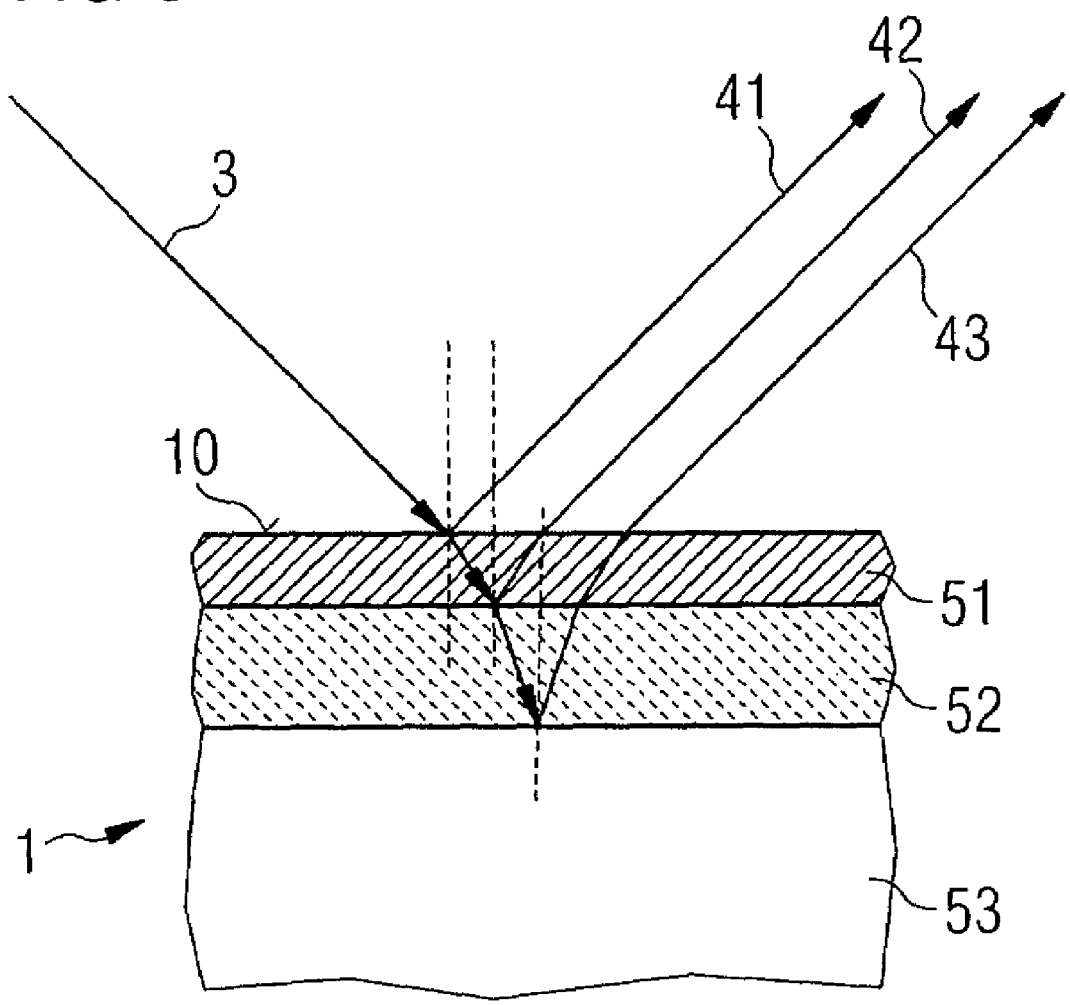

APPARATUS AND METHOD FOR MONITORING TRENCH PROFILES AND FOR SPECTROMETROLOGIC ANALYSIS

FIELD OF THE INVENTION

The present invention relates to an apparatus for monitoring trench profiles of trenches in a substrate, wherein the apparatus is capable of obtaining and analyzing a reflectance spectrum. The invention relates further to a spectrometrologic apparatus based on the apparatus for monitoring trench profiles, to a method of monitoring trench profiles by obtaining and analyzing a reflectance spectrum, a phase change spectrum and/or an amplitude change spectrum and to a spectrometrologic method.

BACKGROUND OF INVENTION

In semiconductor production environments dispersive spectroreflectometry is used as a non-destructive analyzing method of thin layer systems. An incident radiation beam reflects from a sample, and the intensity of the reflected radiation is analyzed to determine properties of the sample. The incident radiation includes multiple frequency components or is monochromatic with a time-varying frequency. The reflected radiation is analyzed at a plurality of measuring frequencies, such that a reflectance spectrum is obtained that illustrates the frequency dependence of the intensity of the reflected radiation.

By analyzing the obtained reflectance spectrum the thickness of thin layers in a multiple layer system covering a semiconductor wafer can be determined respectively through model-based algorithms. The model-based algorithms typically use a multiparameter analysis routine to extract the layer parameters. The analysis routine is a fitting method that fits the reflectance spectrum being obtained by measuring with a further, calculated reflectance spectrum that is obtained by calculating the respective values for a model having equivalent model parameters such as film thickness, refractive index and graded transition-profile thickness. The analysis varies the model parameters until the reflectance spectra obtained by calculating and measuring match.

Further Fourier-transform infrared (FTIR) reflectance-spectroscopy methods have been developed as alternative metrology tool for characterizing layer systems on a semiconductor wafer. A Fourier-transform infrared apparatus bases on a scanning Michelson interferometer, which allows the simultaneous measurement of multiple wavelengths. A beamsplitter separates an initial radiation beam into two beams. The first beam has a fixed path length, while the path length of the second beam is periodically varied. The two beams are then recombined such that interference occurs between the beams according to their optical path difference. In this way, an interferogram is obtained that plots the respective radiation intensity against the mirror position, which is related to the optical path difference. Then a Fourier transform of the interferogram is performed, wherein the reflectance spectrum is obtained, which is then analyzed according to the yet discussed various model-based analyzing methods.

According to ellipsometric methods, the incident radiation beam has a known polarization state and the polarization state of the reflected radiation is analyzed to determine properties of the sample.

For patterned layer systems having a 3D-topography the model-based fitting algorithms become more complicated. The layer parameters and the simulated 3D-topography obtained from the model-based fitting algorithm do not always match well with the actual layer system. Especially for a substrate having a 3D-topography with high aspect ratio trenches with partially rough inner sidewalls, the model-based fitting algorithms often render insufficient results.

SUMMARY

According to a first aspect, the present invention provides an apparatus for monitoring a trench profile. The apparatus comprises: a radiation-emitting unit, a radiation detection unit, an analyzing unit, a processor and an output unit.

The radiation-emitting unit irradiates a section of a pattern surface of a substrate having trenches with infrared radiation, wherein the infrared radiation includes a plurality of measuring frequencies between a lower radiation frequency limit and an upper radiation frequency limit. The infrared radiation detection unit measures the intensity and/or the polarization state of the infrared radiation reflected from the section of the pattern substrate at the measuring frequencies. From the measured intensity and/or polarization state, the analyzing unit determines an intermediate value of the section of the pattern surface in relation to the respective measuring frequency, such that an intermediate spectrum is obtained comprising pairs of variables. The frequency dependent intermediate values describe properties of the radiated section, e.g., the reflectance r(f), the relative phase change delta(f) and/or the relative amplitude change psi(f). Each pair of variables includes a measuring frequency and the respectively corresponding intermediate value. The processor performs a Fourier transformation of the intermediate spectrum, wherein a second order Fourier spectrum is obtained from the intermediate spectrum. The second order Fourier spectrum includes pairs of calculated variables. Each pair of calculated variables includes a value for virtual amplitude and a respectively corresponding value of a frequency periodicity, wherein the respective value of frequency periodicity corresponds with a substrate depth and where a peak of the virtual amplitude may indicate the occurrence of reflective planes within the substrate. The output unit outputs the pairs of calculated variables.

Thus the occurrence of additional reflective planes such as discontinuous interfaces with abruptly increasing or decreasing trench diameter, or rough sections in the trench profile may be identified without using complex model-based fitting algorithms. Abnormal profiles can be easily detected independently from a current process scheme for trench formation. By analyzing position and form of the peaks, typical failures of the trench formation process may be identified resulting in accelerated and enhanced process control.

According to another exemplary embodiment, the apparatus includes further or instead of an output unit, a model-based fitting unit capable of approximating a calculated intermediate spectrum of a simulated model to the obtained measured intermediate spectrum by varying the layer configuration parameters that form the basis of the simulated model. The results of an analysis of the second order Fourier spectrum are forwarded into the model or into the fitting algorithm.

Since the model may then more precisely describe the actual facts, the results of the model-based fitting algorithms are improved and more accurate information may be obtained about the layer configuration and the 3-D topography.

In another aspect, the present invention provides a method of monitoring a trench profile. A section of a pattern surface of a semiconductor wafer having trenches is irradiated with infrared radiation, wherein the infrared radiation comprises a plurality of measuring frequencies between a lower radiation frequency limit and an upper radiation frequency limit. The intensity and/or polarization state of the infrared radiation reflected from the substrate is measured at the measuring frequencies. From the measured intensity and/or polarization state, intermediate values of the substrate, e.g., reflectance r(f), relative phase change delta(f) and/or relative amplitude change psi(f), are determined in relation to the respective measuring frequency, such that an intermediate spectrum is obtained comprising variable pairs of measuring frequency and respectively corresponding intermediate value. A Fourier transformation of the intermediate spectrum is performed, such that a second order Fourier spectrum is obtained from the intermediate spectrum. The second order Fourier spectrum comprises pairs of calculated variables. Each pair of calculated variables includes a value for a virtual amplitude and a respectively corresponding value for a frequency periodicity, wherein the respective value of frequency periodicity corresponds with a substrate depth and wherein the virtual amplitude a peak value indicates a reflective plane in the substrate. The pairs of variables, which include information about the trench profile, are outputted.

Thus the occurrence of reflective planes such as discontinuous interfaces with abruptly increasing or decreasing trench diameter, and rough sections of the trench profile can be identified without using complex model-based fitting algorithms. Abnormal profiles can be easily detected. The method is purely analytical and is independent from the actual process scheme for forming the trenches. By analyzing position and form of the peaks in the second order Fourier spectrum, typical failure schemes of the trench formation process may be identified. Therefore, accelerated and enhanced process control is possible.

In yet another aspect, the invention provides a spectrometrologic analyzing method. This method is based on the method of monitoring trench profiles and comprises a step of feeding forward the results obtained by analysis of the second order Fourier spectrum into a model-based fitting algorithm.

Since, e.g., a start model, the model-based fitting algorithm describes the actual facts more precisely, the results of model-based fitting algorithms may be improved.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

The disclosure will present in detail the following description of exemplary embodiments with reference to the following Figures.

FIG. 3 is a cross-sectional view of a multi-layer system and illustrates schematically the mode of operation of a spectrometrological analyzing apparatus in general.

Corresponding numerals in the different figures refer to corresponding parts and features unless otherwise indicated. The figures are drawn to clearly illustrate the relevant aspects of the exemplary embodiments and are not necessarily in all respects drawn to scale.

DETAILED DESCRIPTION

Figure 1:
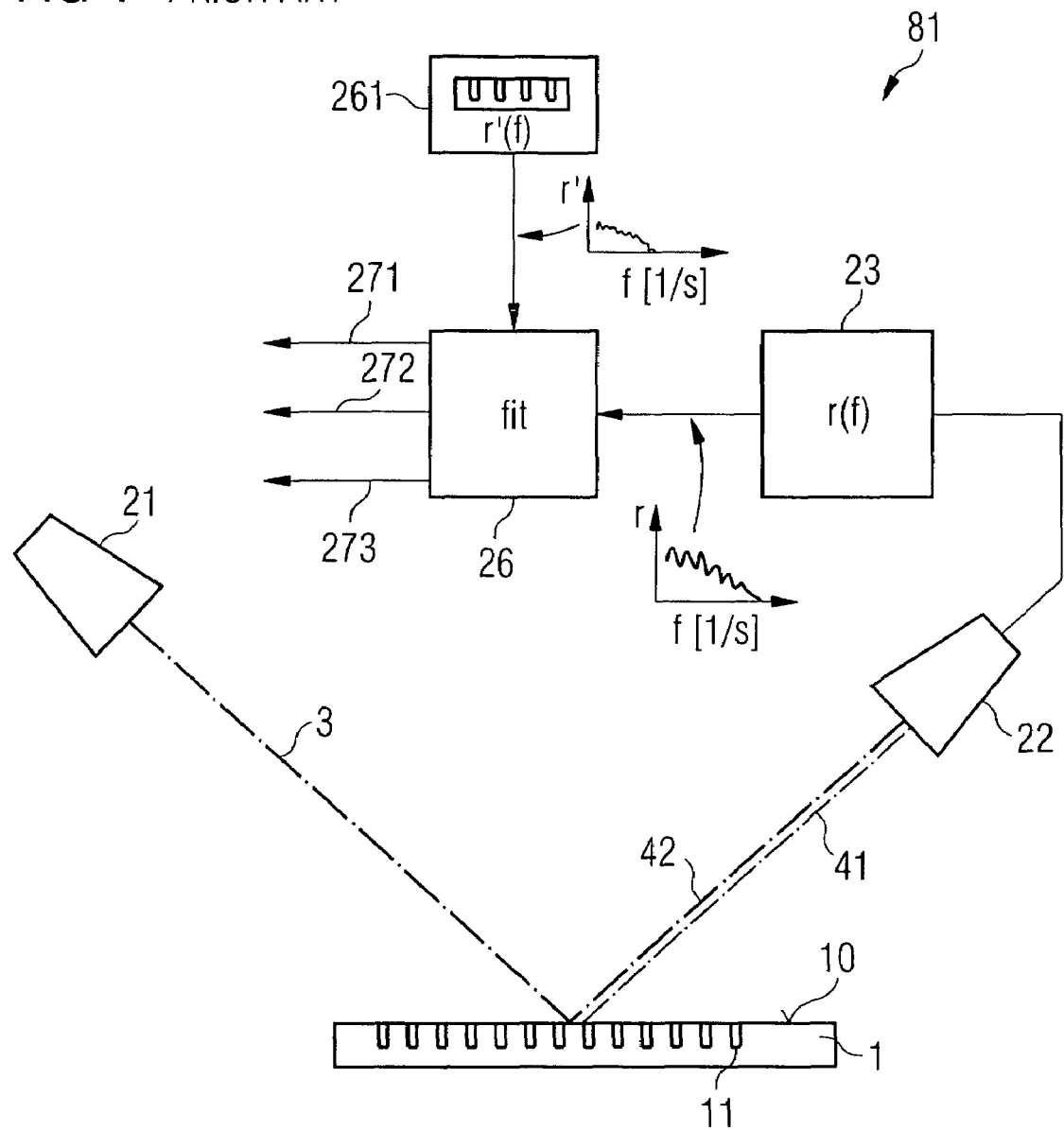
FIG. 1 illustrates schematically a conventional apparatus for spectrometrologic analysis of multi-layer systems covering semiconductor wafers.

Referring to FIG. 1, a conventional spectrometrologic analyzing apparatus 81 includes radiation-emitting unit 21 that emit infrared radiation comprising a plurality of measuring frequencies and irradiating a section of a pattern surface 10 of a substrate 1 with incident radiation beam 3. Trenches 11 are formed within the substrate 1 and adjacent to the pattern surface 10. The incident radiation beam 3 is reflected off different reflective planes within the substrate 1. Each reflective plane generates reflected radiation beams 41, 42 respectively.

The reflected radiation beams 41, 42 are detected by a radiation detection unit 22 of apparatus 81 and are then analyzed by an analyzing unit 23 of apparatus 81. Thereby, a reflectance spectrum r(f) is obtained relating a reflectance value to each measuring frequency respectively. The reflectance spectrum r(f) comprises all parameters of a layer configuration and a 3D-topography of at least an upper section of the substrate 1, wherein the upper section adjoins the pattern surface 10.

Further a calculated reflectance spectrum r'(f) is simulated on the basis of an approximate model of the layer configuration and the 3D-topography. A model-based fitting unit 26 approximates the calculated reflectance spectrum r'(f) as close as possible to the reflectance spectrum r(f), that is obtained by measuring, wherein the layer configuration parameters that form the basis of the calculated model are varied. The parameters 271, 272, 273, that correspond to the best matching simulated reflectance spectrum r'(f), are regarded as describing the best actual layer configuration and 3D-topography and are outputted as the result by the model-based fitting unit 26.

Figure 2:
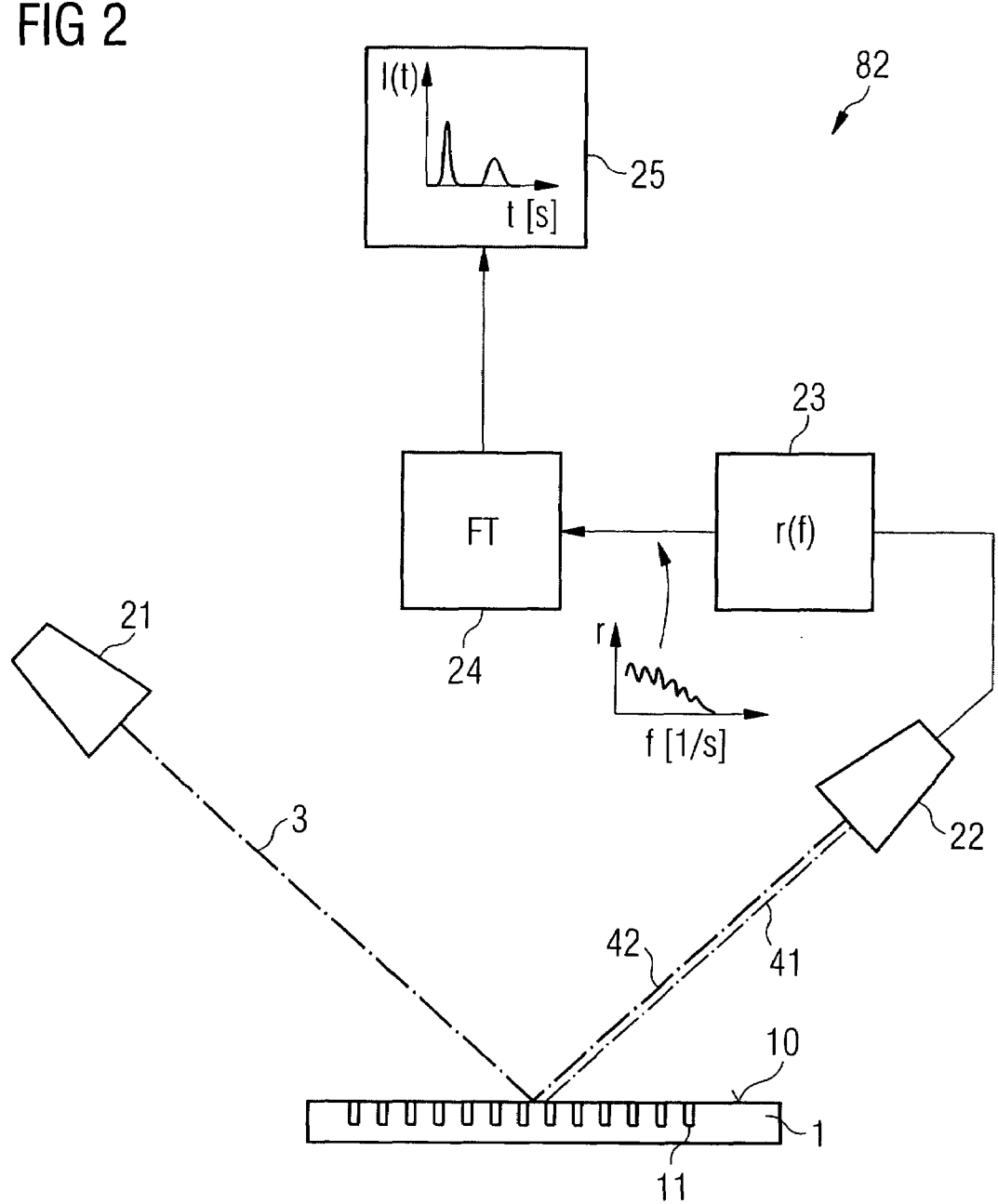
FIG. 2 illustrates schematically an apparatus for monitoring trench profiles according to a first embodiment of the invention.

Referring now to FIG. 2, an exemplary embodiment, of the inventive apparatus 82 for monitoring trench profiles, is described. Apparatus 82 includes a radiation-emitting unit 21 for emitting infrared radiation that irradiates a section of a pattern surface 10 of a substrate 1 as an incident radiation beam 3. The emitted infrared radiation comprises a plurality of measuring frequencies and may be a monochromatic radiation, whose frequency varies with time, or a polychromatic radiation that has a continuous spectrum. The measuring frequencies may range from about 400 1 cm to 7000 1 cm in terms of a wavenumber. In one embodiment, the measuring frequencies range from about 700 1 cm to 5500 1 cm in terms of the wavenumber. The emitted infrared radiation may have a known polarization state, e.g., linearly polarized.

The substrate 1 may be a semiconductor wafer from which semiconductor memory devices are obtained. The trenches 11, for the formation of trench capacitors, are formed by etching within the substrate 1 and adjacent to the pattern surface 10, wherein a top layer may act as a hardmask. The incident radiation beam 3 is reflected on a plurality of reflective planes within the substrate 1. Such reflective planes may be: the pattern surface 10, an interface between the top layer and a semiconducting section of the substrate 1, the trench bottoms and further interfaces between portions of the trenches 11 that were processed in different ways. Each reflective plane corresponds to reflected radiation beams 41, 42 respectively.

The reflected radiation beams 41, 42 are detected by the radiation detection unit 22 and analyzed by the analyzing unit 23 of the apparatus 82. Thereby, a reflectance spectrum r(f) may be obtained, such that relates a reflectance value to each measuring frequency respectively. The obtained reflectance spectrum r(f) comprises all parameters of a layer configuration and a 3D-topography of an upper section of the substrate 1, wherein the upper section adjoins the pattern surface 10.

If the polarization state of the incident radiation beam 3 is known, additionally or alternatively, the polarization state of the reflected radiation beams 41, 42 may be measured and analyzed.

Linearly polarized radiation, when reflected from the substrate 1, will change its state to be elliptically polarized. From the shape and orientation of the ellipse and from the polarization state of the incident radiation beam 3, a relative phase change delta(f) and a relative amplitude change psi(f) may be obtained and may be used to calculate: the refractive index, thickness and shape of films and/or layers within the substrate 1.

A processor 24 of the apparatus 82 performs a Fourier transformation of: the obtained reflectance spectrum r(f), the relative phase change spectrum delta(f) and/or the relative amplitude change spectrum psi(f), such that a secondary or second order Fourier spectrum is obtained. The second order Fourier spectrum is interpreted as a representation of the periodicity of a frequency response.

The output unit 25 of apparatus 82, outputs the values of the second order Fourier spectrum. The second order Fourier spectrum may be outputted as a table or as a diagram I(p) with the virtual amplitude I plotted against a frequency periodicity p, wherein the unit of frequency periodicity p corresponds to 1/1/sec.

In general, the spectrum of a signal containing an echo has an additive periodic component, and thus the second order Fourier spectrum exhibits a peak corresponding to the echo delay. The echo delay is a measure for the distance between the source of the original signal and the source of the delayed signal thus representing rough information concerning the occurrence and characteristics of reflective planes. A quick overview about the characteristics of a sample, such as the substrate, may be obtained without any troublesome modeling. Processes that may be characterized by the frequency of occurrence of reflective planes can easily be qualified allowing a quick response to process deviations and fast process control. The roughness of trench profiles may be qualified in a simple way.

FIG. 3 illustrates, in general, the mode of operation of a spectrometrologic analyzing apparatus via a cross-sectional view of a substrate 1 including a multi-layer system with a first, a second and a third layer 51, 52, 53, wherein the first layer 51 covers the second layer 52 and the second layer 52 covers the third layer 53. An incident radiation beam 3 is partially reflected on a pattern surface 10 of the substrate 1. The non-reflected portion of the incident radiation beam 3 is partially reflected on an interface plane between the first layer 51 and the second layer 52, and a further portion is reflected on an interface plane between the second layer 52 and the third layer 53. As different substances absorb, reflect or emit radiation in different ways, the reflected irradiation beams 41, 42, 43 contain information, e.g., thickness and occurrence, about the materials of the layers 51, 52, 53.

Referring to FIGS. 4A to 4C and FIGS. 5A to 5C, a method for monitoring trench profiles in a semiconductor wafer according to an embodiment of the invention is described via two schematic cross-sectional views of a substrate 1 having trenches 11 of different: profile, respective corresponding reflectance spectra, and respective corresponding second order Fourier spectra.

Figure 4A:
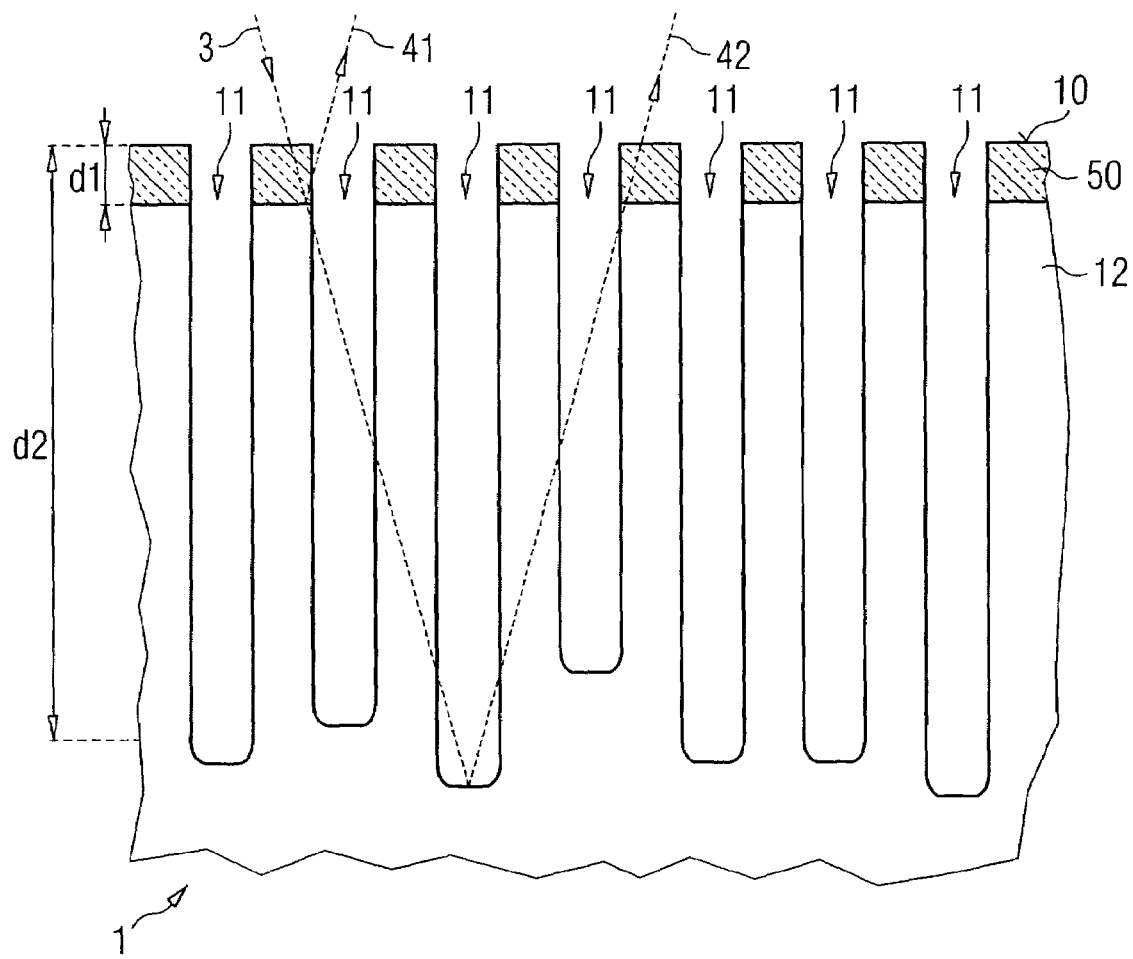
FIG. 4A is a simplified cross-sectional view of a section of a substrate having trenches with smooth sidewalls and illustrates schematically a method of monitoring trench profiles according to a second embodiment of the invention.

FIG. 4A illustrates a substrate 1 having a pattern surface 10 and trenches 11. The trenches 11 extend from the pattern surface 10 into the substrate 1 and have smooth sidewalls without any appreciable roughness. A top layer 50 of the substrate 1 acts as a hardmask for an etch process that at least partly defines the trenches 11. The top layer 50 has a thickness d1 and may comprise silicon nitride. The Trenches 11 have a medium trench depth d2 that may range up to several micrometers and may have a diameter of less than 110 nanometers. In one embodiment, the substrate 1 is a silicon wafer from which DRAM devices with trench capacitor memory cells are obtained.

An incident radiation beam 3 irradiates a section of the pattern surface 10. A first portion of the incident radiation beam 3 is reflected on the pattern surface 10 (not shown). A second portion is reflected as the radiation beam 41 along the interface between the top layer 50 and a semiconducting section 12 of the substrate 1. A further portion is reflected as the radiation beam 42 at the bottom of the trenches 11 respectively.

Figure 4B:
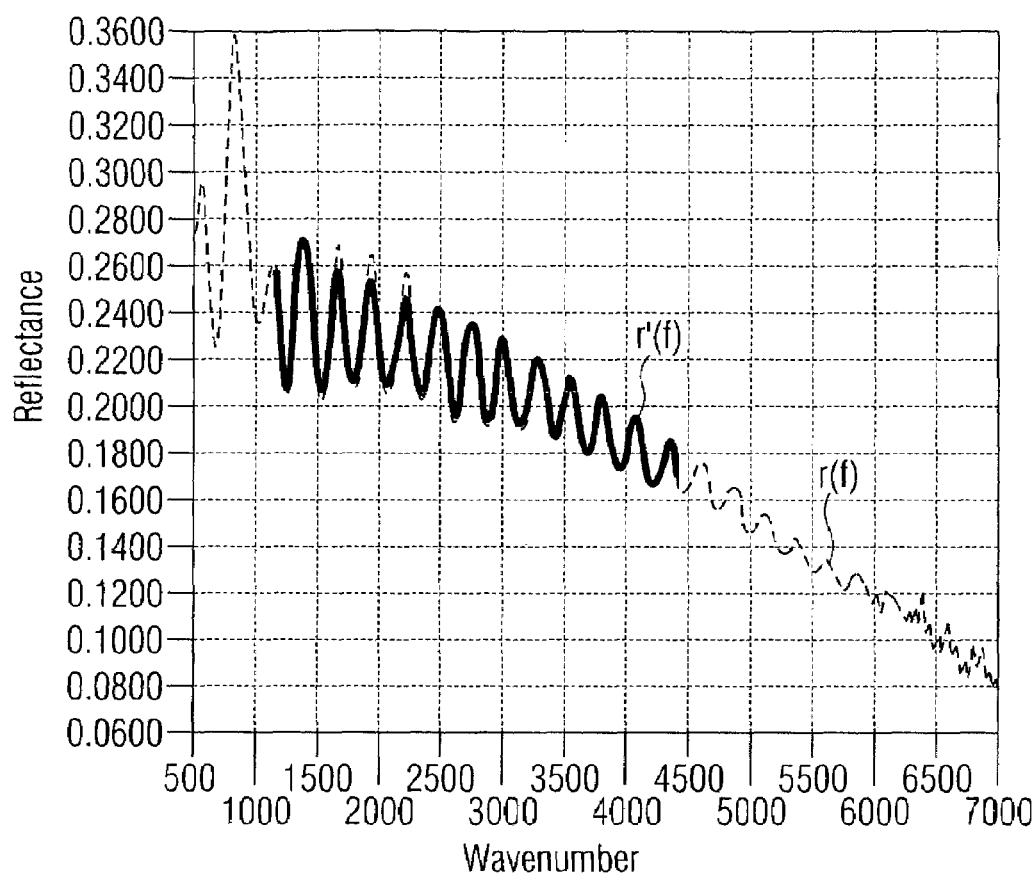
FIG. 4B shows a reflectance spectrum obtained by analyzing the substrate according to FIG. 4A.

FIG. 4B illustrates a diagram with a scaled value for reflectance being plotted against the respectively corresponding measuring frequency. The measuring frequency is scaled in terms of a wavenumber. The dotted line represents a measured reflectance spectrum r(f) being obtained from the sample of FIG. 4A, e.g., via a detection unit and an analyzing unit of an apparatus according to FIG. 1 or FIG. 2.

By running a model-based fitting algorithm, a simulated reflectance spectrum r'(f) is obtained. The parameters, forming the basis for that simulated reflectance spectrum r'(f) that matches best with the reflectance spectrum being obtained by measuring, are regarded as describing the best actual sample according to FIG. 4A. The deviation of simulated reflectance spectrum r'(f) from actual reflectance spectrum r(f) is small. The simulated reflectance spectrum r'(f) closely represents the actual facts.

Figure 4C:
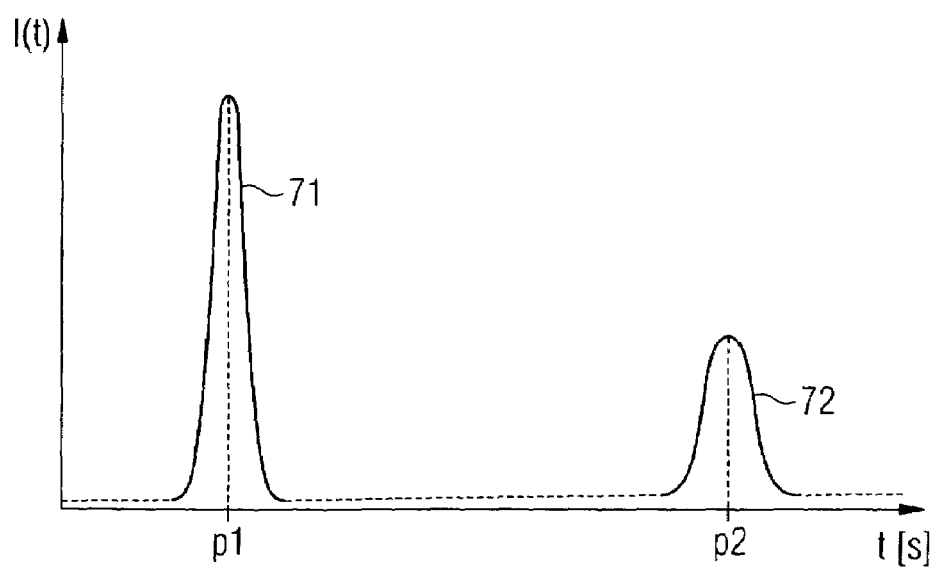
FIG. 4C shows a second order Fourier spectrum obtained by Fourier transformation of the reflectance spectrum of FIG. 4B.

FIG. 4C shows a second order Fourier spectrum obtained from the sample of FIG. 4A. As the second order Fourier spectrum represents the frequency of periodicity, the second order Fourier spectrum exhibits peaks 71, 72 at periodicities p1, p2 respectively. The peaks 71, 72 correspond to an echo delay p2–p1 between the signal and the corresponding echo signal. The reflected irradiation beam 42 may be interpreted as a delayed irradiation beam 41. The echo delay p2–p1 is therefore a measure for the distance between the source of the reflected irradiation beam 42 and the reflected irradiation beam 41 and thus for the difference between medium trench depth d2 and layer thickness d1. The amplitude and span of the respective peaks 71 to 72 contain information about conformity of the layer thickness d1 and distribution of the trench bottom depth d2.

Figure 5A:
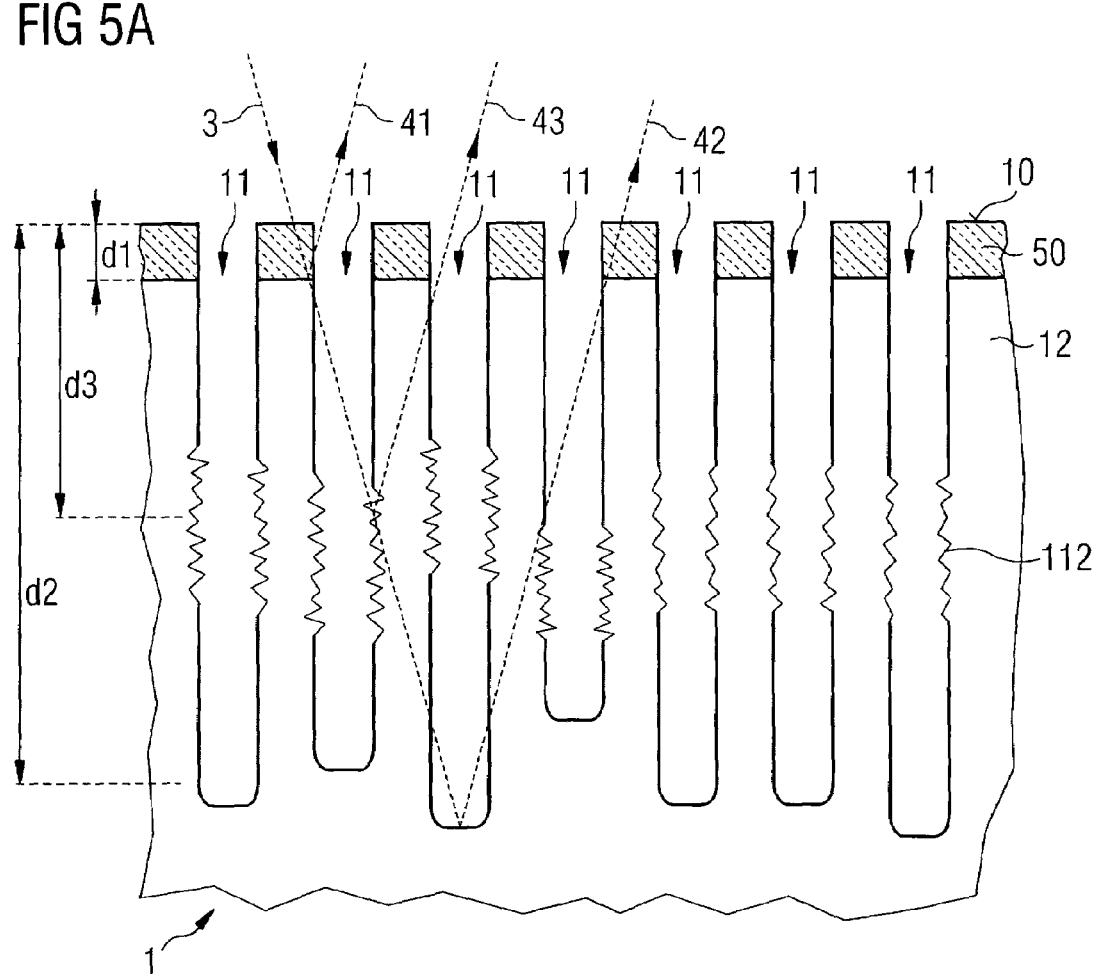
FIG. 5A is a simplified cross-sectional view of a section of a substrate having trenches with partially rough sidewalls and illustrates schematically the method of monitoring trench profiles according to the second embodiment of the invention.

FIG. 5A illustrates a further substrate 1 having a pattern surface 10 and trenches 11. The trenches 11 extending from the pattern surface 10 into the substrate 1 have sidewalls with a rough section 112 at a medium roughness depth d3. The incident radiation beam 3 irradiating a section of the pattern surface 10 is additionally reflected on non-vertical sections of the respective rough section 112 as further reflected radiation beam 43.

Depending on the process of forming the trenches 11, the rough section may be a uniform section as illustrated in FIG. 5A. The rough section 112 may also be split in two rough sub-sections if the trenches 11 are formed according to a multi-step trench formation process.

Figure 5B:
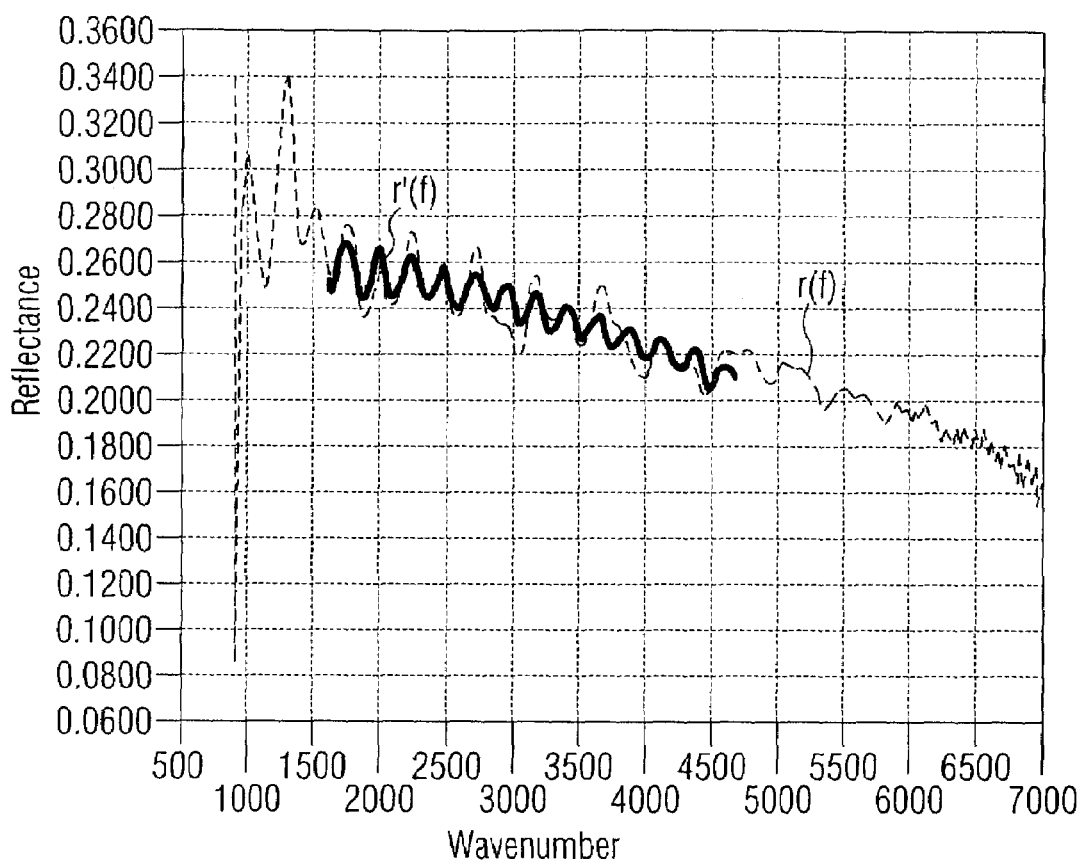
FIG. 5B shows a reflectance spectrum obtained by analyzing the substrate according to FIG. 5A.

FIG. 5B illustrates a further diagram with a scaled value for reflectance being plotted against the respectively corresponding measuring frequency. The dotted line represents a measured reflectance spectrum r(f) obtained from the sample of FIG. 5A. The model-based fitting algorithm according to FIG. 4B is executed and a further simulated reflectance spectrum r'(f) is obtained.

Due to the rough sections 112, the deviation of the simulated reflectance spectrum r'(f) from the actual reflectance spectrum r(f) remains relatively large. In this case, the simulated reflectance spectrum r'(f) delivers a poor representation of the actual facts. This indicates that the actual facts on the substrate deviate seriously from the facts assumed for the model. No exact information about the occurrence and location of the rough sections 112 can be drawn from the results. No further information about the present failure type of the trench formation process can be obtained from the model-based fitting algorithm. Further time-consuming adaptation of the model-based fitting algorithm or optical post failure analysis methods is required. A process control loop for correcting insufficient trench sidewall properties is slow.

Figure 5C:
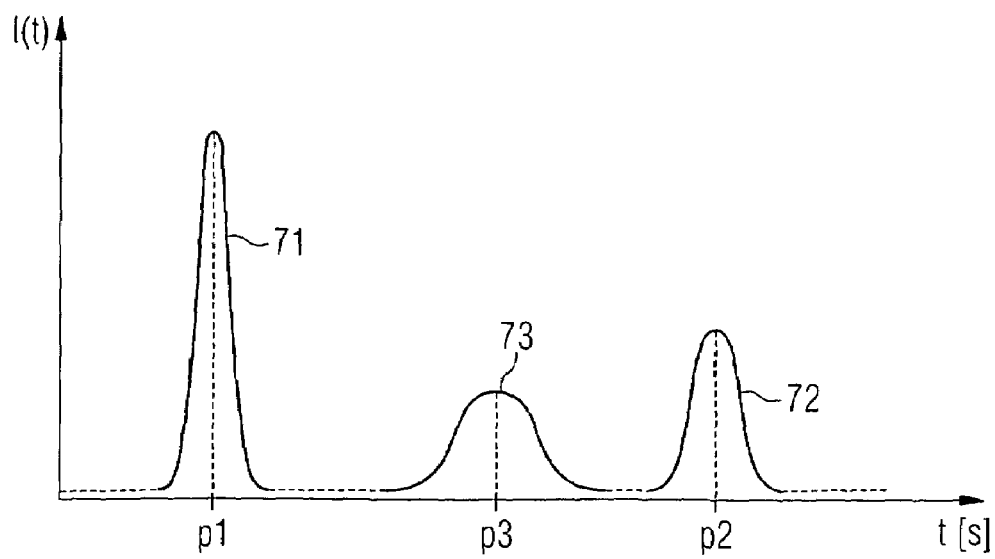
FIG. 5C shows a second order Fourier spectrum obtained by Fourier transformation of the reflectance spectrum of FIG. 5B.

FIG. 5C shows the second order Fourier spectrum corresponding to the sample of FIG. 5A. The second order Fourier spectrum exhibits a further peak 73 at a periodicity p3 corresponding to an echo delay p3–p1 between the signal from the reflected irradiation beam 41 and the reflected irradiation beam 43. The echo delay p3–p1 is therefore a measure for the distance between the reflected irradiation beam 41 and the reflected irradiation beam 43 resulting from sidewall roughness. The amplitude and span of the peak 73 contain information about: occurrence, position and extent of sidewall roughness. From occurrence, position and extent of sidewall roughness, helpful information concerning the trench formation process can be obtained.

A quick overview about the characteristics of the trench sidewalls may be obtained without any troublesome modeling. Processes that may be characterized by the predetermined characteristics of occurrence of sidewall roughness can easily be qualified allowing a quick response to process abnormalities and fast process control. The roughness of the trench profiles may be qualified in a simple way.

Figure 6:
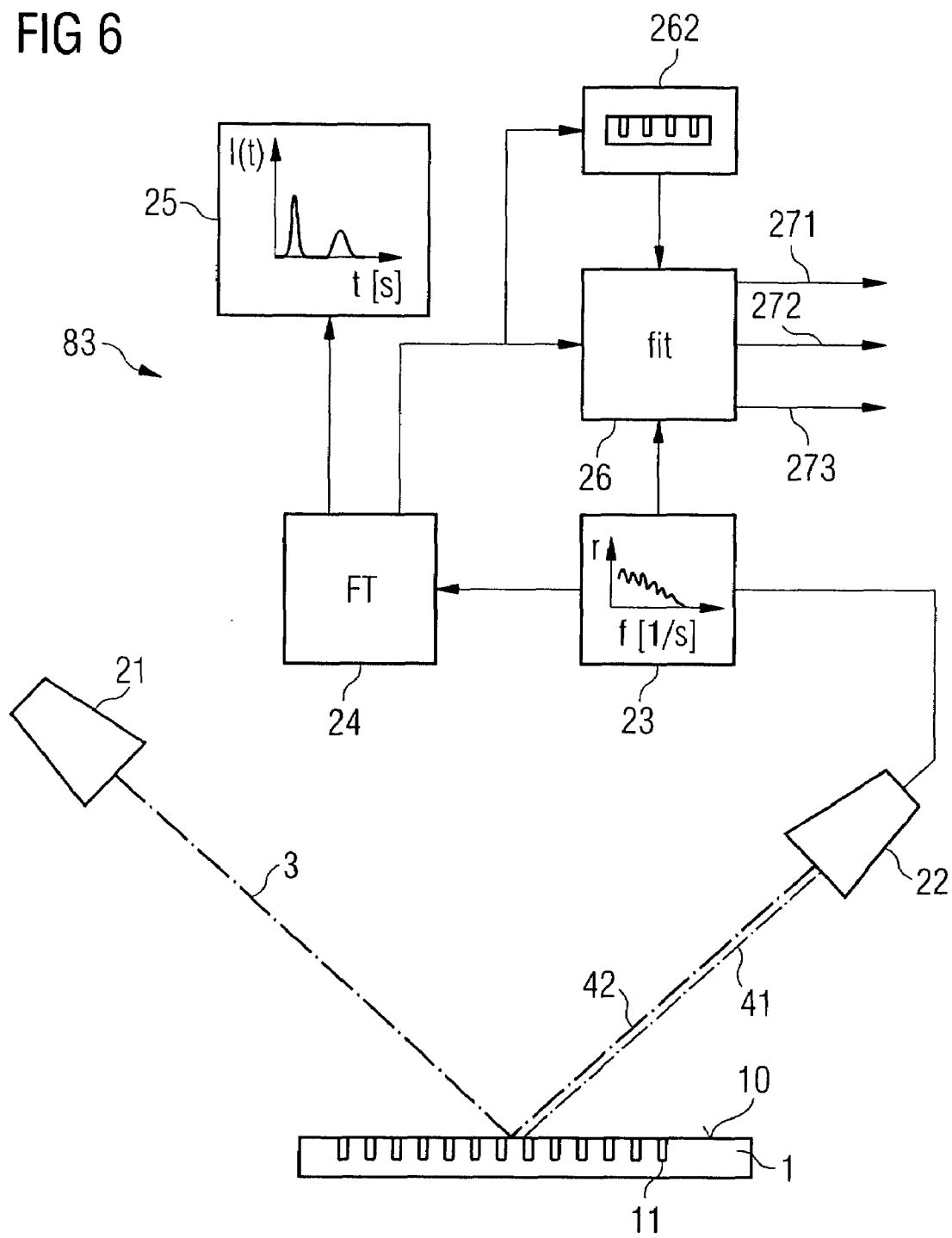
FIG. 6 illustrates schematically an apparatus for monitoring trench profiles and for spectrometrologic analyzing of multi-layer systems covering semiconductor wafers according to a further embodiment of the invention.

Referring now to FIG. 6, a further exemplary embodiment of the inventive apparatus for monitoring trench profiles is described. An apparatus 83 comprises the components of apparatus 82, FIG. 2 and also includes a model-based fitting unit 26.

A reflectance spectrum r(f) is obtained as yet described. The processor 24 of the apparatus 83 performs a Fourier transformation of the obtained reflectance spectrum r(f), and a secondary or second order Fourier spectrum is obtained from the reflectance spectrum. The results of the analysis of the second order Fourier spectrum, e.g., concerning sidewall roughness, are forwarded into the model-based fitting algorithm directly or via another starting model 262. Thus, the fitting algorithm is capable of generating a more accurate simulated reflectance spectrum r'(f) and allows determining further topographic or layer parameters 271, 272, 273 with better precision.

While the invention has been described in detail and with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

LIST OF REFERENCES 1 substrate
10 pattern surface
11 trench
112 rough section
12 semiconducting section
21 radiation-emitting unit
22 radiation detection unit
23 analyzing unit
24 processor
25 output unit
26 model-based fitting unit
261 model
262 model
271 first parameter
272 second parameter
273 third parameter
3 incident radiation beam
41 reflected radiation beam
42 reflected radiation beam
43 reflected radiation beam
50 top layer
51 first layer
52 second layer
53 third layer
71 first peak
72 second peak
73 third peak
81 apparatus
82 apparatus
83 apparatus
p1 frequency periodicity
p2 frequency periodicity p3 frequency periodicity
d1 layer thickness
d2 medium trench depth
d3 medium roughness depth

What is claimed is:

1. An apparatus for monitoring a trench profile, comprising:
    a radiation-emitting unit for irradiating a section of a pattern surface of a substrate having trenches with an incident infrared radiation beam that comprises a plurality of measuring frequencies between a lower radiation frequency limit and an upper radiation frequency limit;
    an infrared radiation detection unit for measuring the intensity and/or polarization state of reflected infrared radiation beams being reflected from the section of the pattern substrate at the measuring frequencies;
    an analyzing unit for determining intermediate values in relation to the respective measuring frequency, such that an intermediate spectrum comprising pairs of variables is obtained from the measured intensity and/or polarization state, and wherein each pair of variables comprises a measuring frequency and a corresponding intermediate value;
    a processor for performing a Fourier transformation of the intermediate spectrum that obtains a second order Fourier spectrum comprising pairs of calculated variables that include: a value for a virtual amplitude, a corresponding value for a frequency periodicity that corresponds with a substrate depth, and a value for a peak of the virtual amplitude that indicates a reflective plane within the substrate, wherein the apparatus outputs the pairs of calculated variables.

2. The apparatus according to claim 1,
    wherein the infrared radiation detection unit is capable of measuring the intensity of the reflected infrared radiation beams;
    wherein the analyzing unit is capable of determining reflectance values of the section of the pattern surface in relation to a respective measuring frequency, such that a reflectance spectrum is obtained as the intermediate spectrum, wherein the reflectance spectrum comprises pairs of variables which include a measuring frequency and a corresponding reflectance value; and
    wherein the processor performs a Fourier transformation of the reflectance spectrum.

3. The apparatus according to claim 1,
    wherein the radiation-emitting unit is capable of irradiating linearly polarized infrared radiation;
    wherein the infrared radiation detection unit is capable of determining the polarization state of the reflected infrared radiation beams; and
    wherein the analyzing unit is capable of determining relative phase change values and/or relative amplitude change values of the section of the pattern substrate in relation to the respective measuring frequency, such that a phase change spectrum or an amplitude change spectrum is obtained as the intermediate spectrum, wherein the processor performs a Fourier transformation of the phase change spectrum and/or the amplitude change spectrum.

4. The apparatus according to claim 1, wherein the apparatus is operable for outputting the pairs of calculated variables in a 2-D graph with the virtual amplitude plotted against the frequency periodicity.

5. The apparatus according to claim 1, wherein the radiation-emitting unit is operable for supplying infrared radiation with the lower radiation frequency limit substantially equal to 700 1/cm.

6. The apparatus according to claim 1, wherein the radiation-emitting unit is operable for supplying infrared radiation with the upper radiation frequency limit substantially equal to 5500 1/cm.

7. The apparatus according to claim 1, wherein the radiation-emitting unit is operable for supplying monochromatic radiation, and wherein the plurality of measuring frequencies is obtained by varying with time the wavelength of the monochromatic radiation between the lower and the upper radiation frequency limit.

8. The apparatus of claim 1, wherein the radiation-emitting unit is operable for supplying polychromatic radiation between the lower and the upper radiation frequency limit.

9. A spectrometrologic apparatus comprising:
    a radiation-emitting unit for irradiating a section of a pattern surface, of a substrate having trenches, with an incident infrared radiation beam that comprises a plurality of measuring frequencies between a lower radiation frequency limit and an upper radiation frequency limit;
    an infrared radiation detection unit for measuring an intensity and/or polarization state of reflected infrared radiation beams being reflected from the section of the pattern substrate at the measuring frequencies;
    an analyzing unit for determining intermediate values in relation to a respective measuring frequency, such that an intermediate spectrum comprising pairs of variables is obtained from the measured intensity and/or polarization state, and wherein each pair of variables comprises a measuring frequency and a corresponding intermediate value;
    a processor for performing a Fourier transformation of the intermediate spectrum that obtains a second order Fourier spectrum comprising pairs of calculated variables that include: a value for a virtual amplitude, a corresponding value for a frequency periodicity that corresponds with a substrate depth; and
    a model-based fitting unit capable of receiving the results of the processor and matching a calculated intermediate spectrum, that is based on a model by parameters, with the obtained intermediate spectrum.

10. The apparatus according to claim 9,
    wherein the infrared radiation detection unit is capable of measuring the intensity of the reflected infrared radiation beams;
    wherein the analyzing unit is capable of determining reflectance values of the section of the pattern surface relative to the respective measuring frequency, such that a reflectance spectrum is obtained as the intermediate spectrum, wherein the reflectance spectrum comprises pairs of variables, wherein each pair of variables comprises a measuring frequency and a corresponding reflectance value, such that the processor performs a Fourier transformation of the reflectance spectrum; and
    wherein the model-based fitting unit is capable of matching a calculated reflectance spectrum, as the calculated intermediate spectrum, with the obtained reflectance spectrum.

11. The apparatus according to claim 9, wherein
    the radiation-emitting unit is capable of irradiating linearly polarized infrared radiation;

the infrared radiation detection unit is capable of determining the polarization state of the reflected infrared radiation beams;

the analyzing unit is capable of determining relative phase change values and/or a relative amplitude change values of the section of the pattern substrate in relation to the respective measuring frequency, such that a phase change spectrum or an amplitude change spectrum is obtained as the intermediate spectrum and the processor performs a Fourier transformation of the phase change spectrum and/or the amplitude change spectrum; and wherein the model-based fitting unit is capable of matching a calculated phase change spectrum as the calculated intermediate spectrum with the obtained phase change spectrum and/or matching a calculated amplitude change spectrum as the calculated intermediate spectrum with the obtained amplitude change spectrum.

12. The apparatus according to claim 9, further comprising an output unit for outputting the pairs of calculated variables.

13. The apparatus according to claim 9, wherein the model-based fitting unit is capable of outputting calculated parameters of a best matching simulated intermediate spectrum.

14. The apparatus according to claim 9, wherein the radiation-emitting unit is operable to supply infrared radiation between a lower radiation frequency limit substantially equal to 400 1/cm and an upper radiation frequency limit substantially equal to 5500 1/cm.

15. A method of monitoring a trench profile, comprising:
irradiating a section of a pattern surface, of a substrate having trenches, with an incident infrared radiation beam that comprises a plurality of measuring frequencies between a lower radiation frequency limit and an upper radiation frequency limit;

measuring an intensity and/or polarization state of reflected infrared radiation beams being reflected from the section of the pattern substrate at the measuring frequencies;

determining intermediate values in relation to the respective measuring frequency, such that an intermediate spectrum comprising pairs of variables is obtained from the measured intensity and/or polarization state, and wherein each pair of variables comprises a measuring frequency and a corresponding intermediate value;

performing a Fourier transformation of the intermediate spectrum that obtains a second order Fourier spectrum comprising pairs of calculated variables that include: a value for a virtual amplitude, a corresponding value for a frequency periodicity that corresponds with a substrate depth, and a value for a peak of the virtual amplitude that indicates a reflective plane within the substrate that identifies the position of rough sections of sidewalls of the trenches; and outputting the pairs of calculated variables.

16. The method according to claim 15, comprising:
measuring the intensity of the reflected infrared radiation beams; and determining the reflectance values of the section of the pattern surface in relation to the respective measuring frequency, such that a reflectance spectrum is obtained as the intermediate spectrum; and performing a Fourier transformation of the reflectance spectrum.

17. The method according to claim 15, comprising:
irradiating the section of the pattern surface with linearly polarized infrared radiation;

measuring the polarization state of the reflected infrared radiation beams;

determining relative phase change values and/or relative amplitude change values of the section of the pattern substrate in relation to the respective measuring frequency, such that a phase change spectrum or an amplitude change spectrum is obtained as the intermediate spectrum; and performing a Fourier transformation of the phase change spectrum and/or the amplitude change spectrum.

18. The method according to claim 11, wherein the pairs of variables are outputted in order according to increasing frequency periodicity.

19. The method according to claim 11, wherein the pairs of variables are outputted as a 2-D graph with the frequency periodicity plotted along the x-axis.

20. A spectrometrologic method, comprising:
irradiating a section of a pattern surface, of a substrate having trenches, with an incident infrared radiation beam that comprises a plurality of measuring frequencies between a lower radiation frequency limit and an upper radiation frequency limit;

measuring an intensity and/or the polarization state of reflected infrared radiation beams being reflected from the section of the pattern substrate at the measuring frequencies;

determining intermediate values in relation to the respective measuring frequency, such that an intermediate spectrum comprising pairs of variables is obtained from the measured intensity and/or polarization state, and wherein each pair of variables comprises a measuring frequency and a corresponding intermediate value;

performing a Fourier transformation of the intermediate spectrum that obtains a second order Fourier spectrum comprising pairs of calculated variables that include: a value for a virtual amplitude, a corresponding value for a frequency periodicity that corresponds with a substrate depth, and a value for a peak of the virtual amplitude that indicates a reflective plane within the substrate that, as a result, identifies rough sections of sidewalls of the trenches;

feeding the result to a model-based fitting algorithm that is capable of matching a calculated intermediate spectrum, that is based on a model defined by parameters, with the obtained intermediate spectrum by varying the parameters; and performing the model-based fitting algorithm, wherein the parameters, that correspond to a best matching calculated intermediate spectrum, are obtained as resulting parameters.

21. The method according to claim 20, comprising:
measuring the intensity of the reflected infrared radiation beams;

determining reflectance values as the intermediate values, such that a reflectance spectrum is obtained as the intermediate spectrum and a Fourier transformation of the reflectance spectrum is performed; and matching the calculated reflectance spectrum, as the calculated intermediate spectrum, with the obtained reflectance spectrum.

22. The method according to claim 20, comprising:
irradiating the section of the pattern surface with linearly polarized infrared radiation;

measuring the polarization state of the reflected infrared radiation beam;

determining relative phase change values and/or relative amplitude change values of the section of the pattern substrate as the intermediate values, such that a phase change spectrum or an amplitude change spectrum is obtained as the intermediate spectrum and a Fourier transformation of the phase change spectrum and/or the amplitude change spectrum is performed; and matching a calculated phase change spectrum as the calculated intermediate spectrum with the obtained phase change spectrum and/or a calculated amplitude change spectrum as the calculated intermediate spectrum is matched with the obtained amplitude change spectrum.

23. The method according to claim 20, comprising:

outputting the pairs of variables in an ordered fashion according to increasing frequency periodicity.

24. The method according to claim 20, comprising:

outputting the pairs of variables as a 2-D graph with the frequency periodicity plotted along the x-axis.

25. The method according to claim 20, comprising:

defining a starting model for the model-based fitting algorithm with regard to results of an analysis of the second order Fourier spectrum.

* * * * *